United States Patent
Czaplewski-Campbell et al.

(10) Patent No.: US 11,345,790 B2
(45) Date of Patent: May 31, 2022

(54) REDUCING RESIN SQUEEZE-OUT

(71) Applicant: International Business Machines Corporation, Armonk, NY (US)

(72) Inventors: Sarah K. Czaplewski-Campbell, Rochester, MN (US); Eric J. Campbell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 16/539,262

(22) Filed: Aug. 13, 2019

(65) Prior Publication Data
US 2021/0047487 A1 Feb. 18, 2021

(51) Int. Cl.
*C08J 5/24* (2006.01)
*B32B 27/08* (2006.01)
(Continued)

(52) U.S. Cl.
CPC ............ *C08J 5/24* (2013.01); *B29C 65/16* (2013.01); *B29C 66/72* (2013.01); *B32B 27/08* (2013.01); *B32B 2457/08* (2013.01)

(58) Field of Classification Search
CPC ............ C08J 5/24; B29C 65/16; B29C 66/72; B29C 65/14; B29C 65/1406; B29C 65/1496; B29C 65/4835; B29C 65/4875; B29C 65/1606; B29C 65/482; B29C 65/485; B29C 65/4845; B29C 66/324; B29C 66/345; B29C 65/5057; B29C 66/472; B29C 66/721; B29C 66/1122; B32B 27/08; B32B 2457/08; B32B 3/266; B32B 9/002; B32B 2250/44; B32B 2260/021; B32B 2605/18; B32B 9/041; B32B 2260/046; B32B 9/005; B32B 2262/0269; B32B 2262/101; B32B 2262/106; B32B 5/02; B32B 9/04; B32B 9/042; B32B 15/08; B32B 2250/02;
(Continued)

(56) References Cited

U.S. PATENT DOCUMENTS 4,696,711 A 9/1987 Greszczuk
5,209,804 A 5/1993 Trudeau
(Continued)

OTHER PUBLICATIONS

Zhang et al., "Monitoring extent of curing and thermal-mechanical property study of printed circuit board substrates", Microelectronics Reliability, vol. 54, Issue 3, Mar. 2014, pp. 619-628. (Year: 2014).*

*Primary Examiner* — Michael N Orlando
*Assistant Examiner* — Christopher W Raimund
(74) *Attorney, Agent, or Firm* — Stosch Sabo (57) ABSTRACT

Described herein are techniques for reducing resin squeeze-out including a method comprising receiving a first component and a second component, where the first component is configured to be joined to the second component at an overlap area using an adhesive layer to form a structure having a ledge. The method further comprises applying the adhesive layer to the overlap area on the first component. The method further comprises selectively curing a portion of the adhesive layer adjacent to the ledge. The method further comprises forming the structure by combining the first component, the second component, and the adhesive layer and curing a remainder of the adhesive layer.

19 Claims, 3 Drawing Sheets

(51) Int. Cl.
*B29C 65/16* (2006.01)
*B29C 65/00* (2006.01)

(58) Field of Classification Search
CPC ........... B32B 7/12; B32B 9/045; B32B 9/047;
B32B 15/10; B32B 15/14; B32B 21/08;
B32B 21/10; B32B 21/13; B32B 27/12;
B29L 2031/3425
See application file for complete search history.

(56) References Cited

U.S. PATENT DOCUMENTS

| | | | |
|---|---|---|---|
| 5,954,898 | A | 9/1999 | McKague et al. |
| 6,544,902 | B1 | 4/2003 | Farnworth |
| 7,975,378 | B1* | 7/2011 | Dutta ................... H05K 1/0253 29/830 |
| 2004/0091622 | A1 | 5/2004 | Fernandes et al. |
| 2004/0117984 | A1* | 6/2004 | Kim ..................... G02B 6/3608 29/832 |
| 2010/0112283 | A1 | 5/2010 | Howarth et al. |
| 2011/0268945 | A1 | 11/2011 | Cawse |
| 2014/0285979 | A1* | 9/2014 | Chamberlin ......... H05K 3/4611 361/748 |
| 2016/0111380 | A1 | 4/2016 | Sundaram et al. |
| 2017/0111999 | A1 | 4/2017 | Ahn et al. |
| 2017/0271734 | A1 | 9/2017 | Yu et al. |
| 2018/0250852 | A1* | 9/2018 | Kamihara ........... B29C 37/0064 |

* cited by examiner

REDUCING RESIN SQUEEZE-OUT

BACKGROUND

The present disclosure relates to manufacturing with resins or materials containing resins (e.g., prepregs), and, more specifically, to preventing resin squeeze-out (e.g., resin bleed) in component assemblies.

Prepreg refers to material comprising fibers that are pre-impregnated with resin. The fibers can be natural fibers, polymeric fibers, carbon fibers, Kevlar fibers, aramid fibers, glass fibers, or another reinforcement medium in short-fiber, long-fiber, or continuous fiber form. The resin can be a thermoset resin including a curing agent distributed throughout the thermoset resin. Prepregs are typically partially cured (e.g., B-staged) so that they are solid enough to retain their form and malleable enough to be shaped into their final application. Once appropriately shaped, prepregs are fully cured (e.g., C-staged) into their final form.

SUMMARY

Aspects of the present disclosure are directed toward a method comprising receiving a first sub-laminate and a second sub-laminate, where the first sub-laminate is configured to be joined to the second sub-laminate at an overlap area using a prepreg layer to form a structure having a ledge. The method further comprises sizing the prepreg layer to approximate the overlap area. The method further comprises selectively curing a portion of the prepreg layer adjacent to the ledge. The method further comprises forming the structure by combining the first sub-laminate, the second sub-laminate, and the prepreg layer and curing a remainder of the prepreg layer.

Further aspects of the present disclosure are directed toward a printed circuit board (PCB) comprising a first sub-laminate attached to a second sub-laminate at a contact area by a prepreg layer, where the PCB includes a ledge at a transition from the contact area to a non-contact area. In addition, the prepreg layer comprises a portion of the prepreg layer that is adjacent to the ledge and a remainder of the prepreg layer that is not adjacent to the ledge, and the portion of the prepreg layer that is adjacent to the ledge has a higher degree of cure relative to the remainder of the prepreg layer that is not adjacent to the ledge.

Further aspects of the present disclosure are directed toward a method comprising receiving a first component and a second component, where the first component is configured to be joined to the second component at an overlap area using an adhesive layer to form a structure having a ledge. The method further comprises applying the adhesive layer to the overlap area on the first component. The method further comprises selectively curing a portion of the adhesive layer adjacent to the ledge. The method further comprises forming the structure by combining the first component, the second component, and the adhesive layer and curing a remainder of the adhesive layer.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward manufacturing with resins or material containing resins (e.g., prepregs), and, more specifically, to preventing resin squeeze-out (e.g., resin bleed) in component assemblies. While not limited to such applications, embodiments of the present disclosure may be better understood in light of the aforementioned context.

Composite laminates are an assembly of layers of prepregs (and optionally other materials such as copper foils and cores in printed circuit board (PCB) applications, or honeycomb panels in aerospace or marine applications, and so on) which can be joined together to create structures with tailored properties. The properties can be tailored based on the type of reinforcement, the volume of reinforcement, the directionality of the reinforcement, the type of resin, the state of cure, and/or other factors. In some embodiments, composite laminates include changes in thickness (e.g., ledges). Changes in thickness can be used for any number of reasons, such as, for example, a PCB configured to perform electrical signal processing can have section of thinner thickness to accommodate a Peripheral Component Interconnect Express (PCIe) connector and a section of thicker thickness to accommodate other signal traces/card functions of the PCB. Although a PCIe connector was discussed above, any number of electrical contacts, connectors, tabs, and/or interfaces can also be housed by a ledge. As another example, a composite laminate used for a vehicle body can have a ledge useful for assembly (e.g., for mechanically fitting with another component). As another example, a composite laminate used for an aircraft component can have a ledge useful for receiving a sensor for embedded monitoring (e.g., nondestructive evaluation). As will be readily appreciated by one skilled in the art, the presence of ledges in composite laminates are relevant to many applications in many industries.

Manufacturing composite laminates with ledges can be challenging. For example, since a thickness of a composite laminate is driven by the number of plies (e.g., individual lamina) and other layers within the composite laminate, a location with less thickness requires fewer plies than an area with a larger thickness. This can be achieved by one of three techniques: (1) machining the individual lamina to the appropriate dimensions, combining them, and curing the laminate; (2) fabricating a block laminate having dimensions equal to the maximum dimensions of the end structure and subsequently machining the ledges into the block laminate; or (3) creating two or more sub-laminates and then combining the two or more sub-laminates in an assembly using a prepreg layer, where the two or more sub-laminates partially overlap each other, and where the non-overlapping portions of the two or more sub-laminates define ledges.

The first technique (combining individually machined lamina) and the second technique (machining a block laminate) are expensive insofar as precise machining is required (large capital cost for an adequate routing device) and machining is time consuming (large labor costs for operating the routing device and large maintenance costs for maintaining the routing device). The third technique (combining two or more sub-laminates using a prepreg layer) can be advantageous in some situations. For example, there may be less material waste using the third technique. As another example, different sub-laminates may be more efficiently fabricated by different vendors and subsequently assembled by another party.

However, combining two or more sub-laminates using a prepreg layer to form an assembled structure having one or more ledges is associated with the challenge of prepreg squeeze-out (also referred to as resin bleed or resin beading). Prepreg squeeze-out occurs when resin in the prepreg layer flows onto a ledge or edge of the assembled structure during final assembly of the assembled structure and curing of the prepreg layer. Prepreg curing typically requires pressure (together with heat and/or ultraviolet (UV) radiation) to adhere the two or more sub-laminates to each other using the prepreg layer. This pressure can cause the resin to flow toward areas of less resistance (e.g., ledges and edges) while the curing takes place. Cure times can range from minutes to hours depending on the resin system, the desired state of cure, and the equipment used (e.g., an autoclave, a heated press, etc.). Prepreg squeeze-out can thus require additional post-fabrication machining to remove resin that is displaced onto a ledge or edge of the assembled structure. If not removed, the displaced resin can interfere with assemblage, performance, or other aspects of the assembled structure.

One solution addressing the challenge of resin bleed is low-flow (or no-flow) prepregs, where the low-flow prepregs exhibit limited flow during curing. This can be achieved by (1) tailoring the resin properties to have a relatively higher viscosity and lower propensity for flowing and/or (2) reducing the resin content in the prepreg to limit the amount of resin which can be displaced. However, low-flow prepregs can have tradeoffs in terms of performance properties. For example, resin viscosity is typically increased via the addition of modifiers (e.g., thermoplastic resins or ultra-high molecular weight (UHMW) modifiers) which alter the rheological properties of the resin. These modifiers can degrade the performance characteristics of the original resin. As another example, reducing the resin content in the prepreg in order to limit flow can reduce the performance characteristics of the prepreg by including an insufficient amount of resin to adequately bond two or more components together (e.g., a higher propensity for voids in the final laminate). Finally, low-flow prepregs can be relatively more expensive than other prepregs.

In light of the above, aspects of the present disclosure are directed to strategies for reducing prepreg resin bleed by selectively curing portions of a prepreg layer adhering a first sub-laminate to a second sub-laminate, where the selectively cured portion of the prepreg layer is adjacent to one or more ledges in the assembled structure. Advantageously, the selectively cured portions of the prepreg layer can function as a resin dam during final assemblage and curing of the first sub-laminate to the second sub-laminate at the one or more ledges, where the resin dam prevents resin from flowing onto the one or more ledges during final curing of the assembled structure. Further, although a decrease in structural properties may be realized by selectively curing the prepreg layer, these performance decreases are relatively small compared to the relatively large cost savings and performance improvements associated with preventing or reducing prepreg resin bleed on ledges of assembled structures.

Figure 1A:
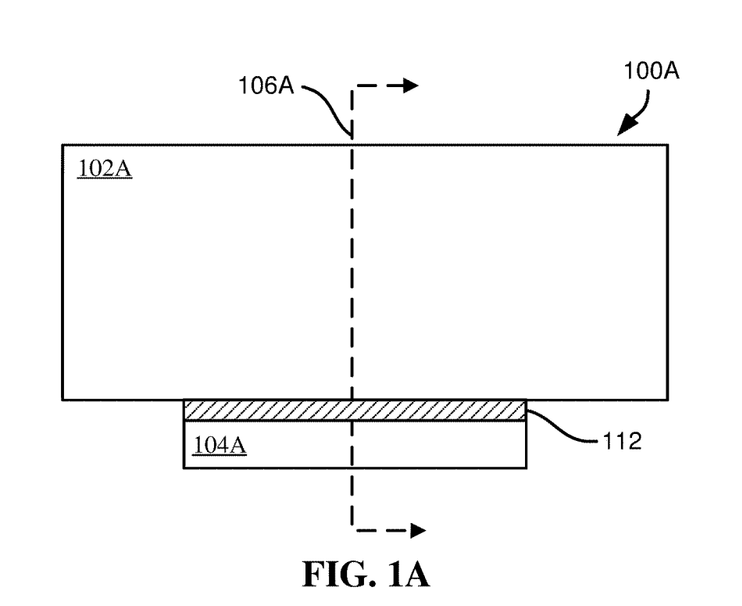
FIG. 1A illustrates a top view of a traditional assembly utilizing prepreg and causing resin squeeze-out.
Figure 1B:
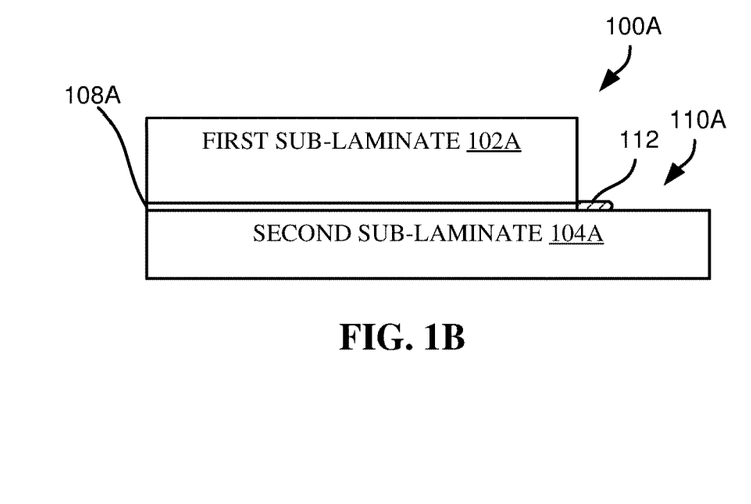
FIG. 1B illustrates a cross-sectional view of a traditional assembly utilizing prepreg and causing resin squeeze-out.

Referring now to FIG. 1A, illustrated is a top view of a first example laminate structure 100A having a first sub-laminate 102A and a second sub-laminate 104A. FIG. 1A illustrates prepreg resin bleed 112 occurring at a change in thickness of the first example laminate structure 100A. FIG. 1B illustrates a cross-sectional view along axis 106A of FIG. 1A. In FIG. 1B, the first example laminate structure 100A is shown with the first sub-laminate 102A attached to the second sub-laminate 104A by prepreg layer 108A to form a ledge 110A. As shown in FIG. 1B, the assembly of first laminate 102A to second laminate 104A causes prepreg resin bleed 112 to contaminate ledge 110A. Prepreg resin bleed 112 can be especially detrimental to the first example laminate structure 100A in cases where the ledge 110A contains a critical component (e.g., an electrical connector, a circuit, a sensor, etc.) that may lose functionality if contaminated by prepreg resin bleed 112, or in cases where the ledge 110A is configured to receive another component with particular dimensions, and where the prepreg resin bleed 112 may cause the ledge 110A to be unable to receive the other component. In situations in which prepreg resin bleed 112 disrupts functionality of the first example laminate structure 100A, the prepreg resin bleed 112 must be removed by post-fabrication chemical cleaning and/or machining.

Figure 1C:
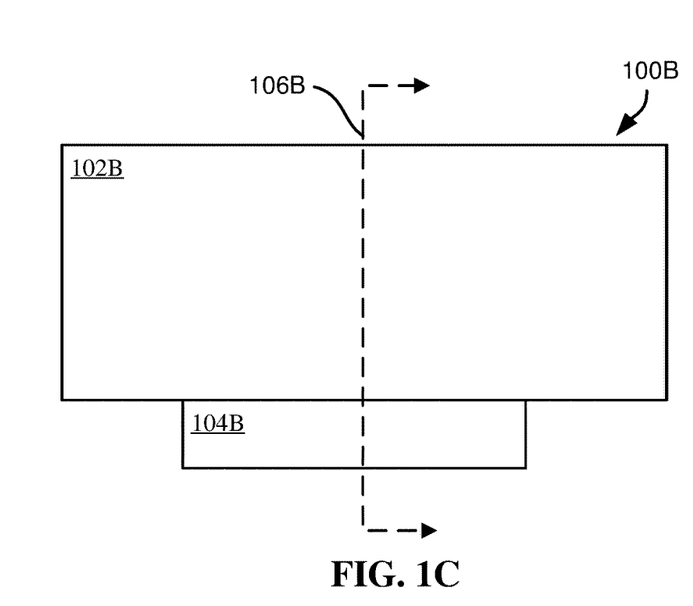
FIG. 1C illustrates a top view of an assembly utilizing prepreg and preventing or reducing resin squeeze-out, in accordance with some embodiments of the present disclosure.
Figure 1D:
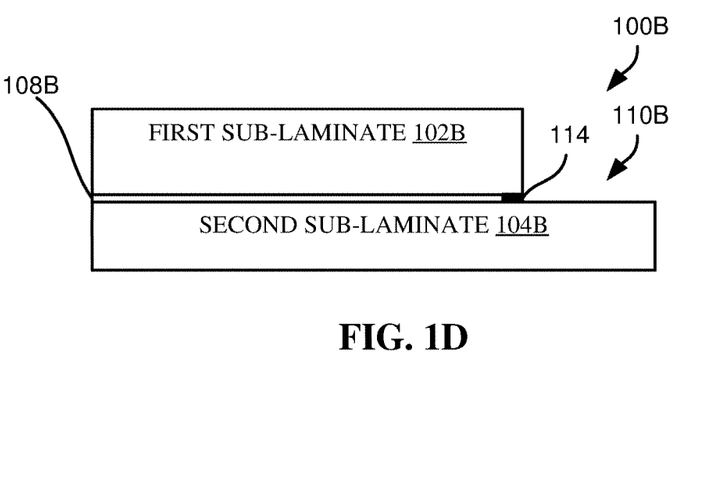
FIG. 1D illustrates a cross-sectional view of an assembly utilizing prepreg and preventing or reducing resin squeeze-out, in accordance with some embodiments of the present disclosure.

In contrast, FIG. 1C illustrates a second example laminate structure 100B fabricated in accordance with embodiments of the present disclosure. Second example laminate structure 100B includes a first sub-laminate 102B and a second sub-laminate 104B. Referring to FIG. 1D, illustrated is a cross-sectional view of the second example laminate structure 100B along the axis 106B of FIG. 1C. In FIG. 1D, the first sub-laminate 102B is shown attached to the second sub-laminate 104B by a prepreg layer 108B to form a ledge 110B. Notably, the ledge 110B is not contaminated by any prepreg resin bleed. Instead, any potential resin bleed is stopped by resin dam 114, where resin dam 114 comprises a selectively cured portion of prepreg layer 108B that is adjacent to ledge 110B.

Resin dam 114 can prevent prepreg resin bleed 112 with acceptable performance trade-offs. For example, resin dam 114 could reduce flexural strength of the second example laminate structure 100B insofar as the resin dam 114 could act as a failure site for bond-line failure during flexural bending of the second example laminate structure 100B. However, many laminate assembly structures are subjected to relatively minor flexural bending forces, if any (e.g., PCBs). As a result, in many applications, the flexural strength performance knock-down of the second example laminate structure 100B because of resin dam 114 is an acceptable and appropriate tradeoff for the cost-savings, time-savings, and quality improvements associated with preventing contamination on ledge 110B by prepreg resin bleed 112.

The dimensions illustrated in FIGS. 1A-1D are purely illustrative and are not to be taken in a limiting sense. For example, the absolute (e.g., literal) dimensions of the drawings are non-limiting. Further, the relative dimensions between components are non-limiting. Further, the shapes shown in FIGS. 1A-1D are non-limiting. For example, although ledges (e.g., 110A and 110B) are formed by a 90-degree angle in FIGS. 1A-1D, this is not always the case. As one example, the first sub-laminate (e.g., 102A, 102B) could taper down to the second sub-laminate (e.g., 104A, 104B) rather than having a squared-off edge. Further, although the ledges (e.g., 110A, 110B) are shown as partially exterior to the example laminate structures (e.g., 100A, 100B), these ledges could also be entirely internal to the laminate structure. Further still, although a generally rectangular ledge (e.g., 110A, 110B) is shown, in some embodiments, the ledge can be cylindrical, elliptical, a polygon, or any other shape. Finally, although sub-laminates and a prepreg layer are discussed above, the present disclosure is applicable to any form of assembly containing two or more components bonded together by an adhesive layer.

Figure 2A:
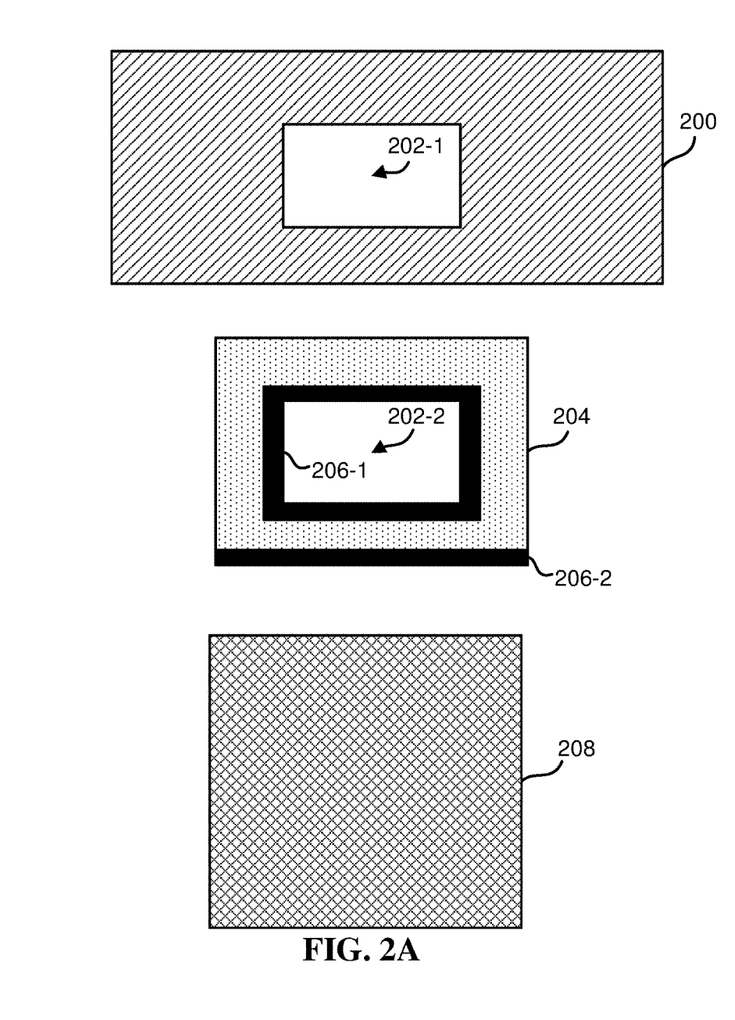
FIG. 2A illustrates top views of a first sub-laminate, a prepreg layer that is selectively cured to prevent or reduce resin squeeze-out, and a second sub-laminate, in accordance with embodiments of the present disclosure.

Referring now to FIG. 2A, illustrated are top views of a first sub-laminate 200, a prepreg layer 204, and a second sub-laminate 208. First sub-laminate 200 includes an internal hole 202-1 (e.g., a cutout). First sub-laminate 200 and second sub-laminate 208 are configured to be joined together in an assembly with an overlapping portion (e.g., a contact area where the first sub-laminate 200 contacts the second sub-laminate 208) and a non-overlapping portion (e.g., a non-contact area where the first sub-laminate 200 does not contact the second sub-laminate 208). Prepreg layer 204 can be sized to approximate the overlapping portion of the first sub-laminate 200 and the second sub-laminate 208 in the final assembly. Prepreg layer 204 includes an internal hole 202-2 approximating the internal hole 202-1. Prepreg layer 204 further includes a resin dam 206-1 surrounding the internal hole 202 together with a resin dam 206-2 along the edge of the prepreg layer 204. Resin dams 206-1, 206-2 can be placed adjacent to non-overlapping portions of the first sub-laminate 200 with the second sub-laminate 208, where the border of an overlapping portion to a non-overlapping portion can comprise a ledge. Although resin dam 206-1 is shown as surrounding all sides of internal hole 202-2 (e.g., four sides), in other embodiments, resin dam 206-1 includes one, two, or three sides instead of all sides. Likewise, although resin dam 206-2 is shown as extending along the entirety of the length of the ledge created by the non-overlapping portions of the first sub-laminate 200 and the second sub-laminate 208, in some embodiments the resin dam 206-2 extends only a portion of the length of the ledge.

Resin dams 206-1, 206-2 comprise selectively cured portions of the prepreg layer 204. In other words, resin dams 206-1, 206-2 exhibit a higher degree of cure relative to the remaining portion of the prepreg layer 204. Degree of cure can be directly estimated using Differential Scanning calorimetry (DSC) or indirectly measured based on glass transition temperature or mechanical properties using Dynamic Mechanical Analysis (DMA) or Thermal Mechanical Analysis (TMA).

In some embodiments, the resin dams 206-1, 206-2 can be considered C-staged (e.g., advanced degree of cure) whereas the remainder of the prepreg layer 204 can be considered B-staged (e.g., partial degree of cure). In other embodiments, the resin dams 206-1, 206-2 can be considered between B-staged and C-staged (e.g., a relatively advanced degree of B-staged), whereas the remainder of the prepreg layer 204 can be considered a less advanced B-staged. However, once combined into a final assembly, all portions of the prepreg layer 204 are cured (e.g., C-staged). Nonetheless, even after final cure of the assembled structure, resin dams 206-1, 206-2 will exhibit a higher degree of cure relative to the remainder of the prepreg layer 204 even though the entirety of the prepreg layer 204 is cured (e.g., hardened). Although degree of cure is discussed above, other metrics can also be used to differentiate the resin dams 206-1, 206-2 from the remainder of the prepreg layer 204 such as, but not limited to:

(i) Glass transition temperature (e.g., $T_g$): where the resin dams 206-1, 206-2 can have a higher $T_g$ relative to the remainder of the prepreg layer 204 (e.g., the portion of the prepreg layer 204 that is adjacent to the ledge can have a higher glass transition temperature relative to the remainder of the prepreg layer 204 that is not adjacent to the ledge);

(ii) Modulus: where the resin dams 206-1, 206-2 can have a higher modulus (e.g., tensile modulus, compressive modulus, flexural modulus, etc.) relative to the remainder of the prepreg layer 204;

(iii) Strength: where the resin dams 206-1, 206-2 can have a higher strength (e.g., tensile strength, compressive strength, flexural strength, etc.) relative to the remainder of the prepreg layer 204;

(iv) Toughness: where the resin dams 206-1, 206-2 can have a lower toughness (e.g., the total area under the stress vs. strain curve) relative to the remainder of the prepreg layer 204. Regarding toughness, although the advanced degree of cure can make the resin dams 206-1, 206-2 stiffer (modulus) and stronger (strength), this advanced degree of cure can also make the resin dams 206-1, 206-2 more brittle, resulting in lower ductility and lower toughness characteristics; and/or (v) Visual Indicators: where the prepreg layer 204 can be loaded with light-sensitive microcapsules that contain a dye or UV fluorophore. In such embodiments, when the resin dams 206-1, 206-2 are selectively cured (e.g., by directed laser), the microcapsules can rupture and the dye/UV fluorophore can be released. Once assembled, the resin dams 206-1, 206-2 can contain a higher prevalence of dye or UV marker relative to the remainder of the prepreg layer 204. In such instances, a portion or area of the prepreg layer 204 which is adjacent to the ledge comprises a larger amount of dye-containing microcapsules relative to the remainder of the prepreg layer 204 that is not adjacent to the ledge. In some embodiments, the microcapsules can include a shell-in-shell construction such that the dye/fluorophore is not released freely on other components of the assembled structure. In these embodiments, the outer shell can be transparent to the laser/UV light functioning as the curing mechanism while the inner shell can break down upon receiving the laser/UV light, thereby releasing the dye/fluorophore only within the outer shell (and not contaminating other components of the assembled structure or the prepreg layer 204).

Resin dams 206-1, 206-2 can be a variety of sizes and/or shapes. For example, the width of a resin dam 206-1, 206-2 can be dependent upon numerous factors such as the total area of prepreg layer 204. In such embodiments, resin dams 206-1, 206-2 can be increasingly wider as a function of increasing area of prepreg layer 204. In other embodiments, the resin dams 206-1, 206-2 can include changes in dimension according to other factors. For example, resin dams 206-1, 206-2 can be less wide or more wide at geometry changes such as corners of internal hole 202-2. In some embodiments, resin dams 206-1, 206-2 range in width from about 1 millimeter (0.04 inches) to about 25 millimeters (e.g., 1.00 inches).

Although FIG. 2A illustrates resin dams 206-1, 206-2 placed adjacent to ledges, in some embodiments, resin dams are also placed along edges of the assembled structure to prevent resin bleed at the edges of the assembled structure. For example, in FIG. 2A, the prepreg layer 204 could further include an additional resin dam around the outer perimeter of the prepreg layer 204. Reducing resin bleed on an edge of an assembled laminate, even where that edge does not necessarily constitute a ledge, can be beneficial for aesthetic purposes and/or for maintaining appropriate dimensions and tolerances of the assembled structure.

In some embodiments, resin dams 206-1, 206-2 of prepreg layer 204 are selectively cured in isolation from the first sub-laminate 200 and the second sub-laminate 208. In other embodiments, resin dams 206-1, 206-2 of prepreg layer 204 are selectively cured while attached to one of the first sub-laminate 200 or the second sub-laminate 208. Selectively curing the resin dams 206-1, 206-2 while attached to one of the first sub-laminate 200 or the second sub-laminate 208 can simplify the final assembly of the first sub-laminate 200 to the prepreg layer 204 to the second sub-laminate 208.

In some embodiments, the resin dams 206-1, 206-2 are selectively cured by directed heat, UV radiation, or another curing mechanism. In these embodiments, the directed heat or UV radiation can be provided by a laser. The laser can be programmed to raster along the resin dams 206-1, 206-2 until a satisfactory degree of cure is achieved.

In some embodiments, the resin dams 206-1, 206-2 are selectively cured by masking a remainder portion of the prepreg layer 204. Masking can include covering the remainder of the prepreg layer 204 with a layer configured to block, inhibit, reduce, mitigate, or otherwise limit exposure to heat, UV radiation, or another curing mechanism used to advance the degree of cure of the resin dams 206-1, 206-2. After masking the remainder of the prepreg layer 204, the prepreg layer 204 can be subjected to a curing mechanism (e.g., a laser) and the resin dams 206-1, 206-2 can be cured while the remainder of the prepreg layer 204 is not cured (or is cured a lesser degree than resin dams 206-1, 206-2) as a result of the masking.

In some embodiments, prepreg layer 204 is sized to approximate the overlapping portion of the first sub-laminate 200 with the second sub-laminate 208. In other embodiments, the prepreg layer 204 is undersized near ledges (e.g., the transition of an overlapping portion to a non-overlapping portion) to further prevent resin bleed. Any undersizing of prepreg layer 204 near ledges can include a variety of dimensions and shapes. For example, undersizing can include undersizing the prepreg layer 204 by between and including about 1 millimeter (0.04 inches) to about 25 millimeters (e.g., 1.00 inches) at locations adjacent to ledges. As an example of undersizing prepreg layer 204 using FIG. 2A for reference, undersizing prepreg layer 204 can include making internal hole 202-2 of prepreg layer 204 larger than internal hole 202-1 of the first sub-laminate.

Figure 2B:
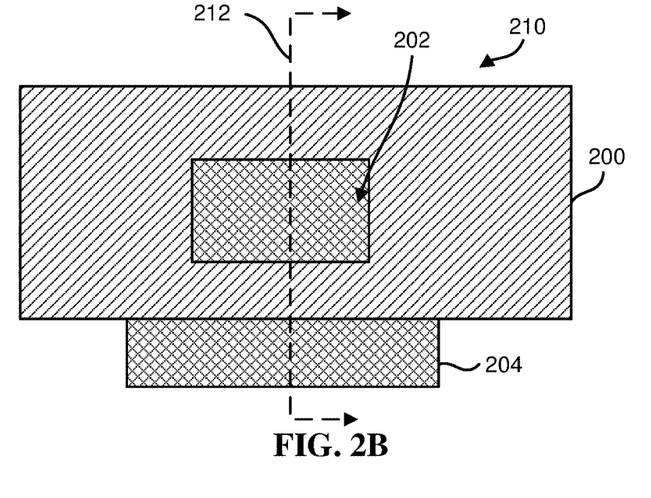
FIG. 2B illustrates a top view of an assembly containing the first sub-laminate, the prepreg layer that is selectively cured to prevent or reduce resin squeeze-out, and the second sub-laminate, in accordance with embodiments of the present disclosure.

FIG. 2B illustrates a top view of an assembled structure 210 comprising the first sub-laminate 200, the prepreg layer 204, and the second sub-laminate 208. As can be seen in FIG. 2B, the assembled structure 210 includes the internal hole 202 in the first sub-laminate 200 that shows through to the second sub-laminate 208 once assembled. In FIG. 2B, the prepreg layer 204 is not visible since it is located in the contact area (e.g., the overlapping portion) of the assembled structure 210 which is not visible in the top view shown in FIG. 2B.

Figure 2C:
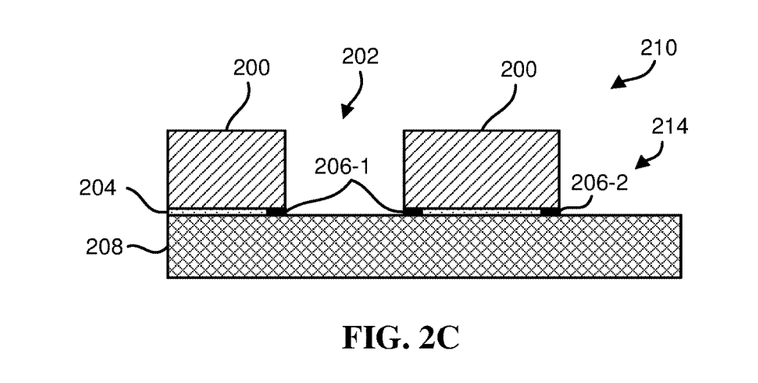
FIG. 2C illustrates a cross-sectional view of the assembly containing the first sub-laminate, the prepreg layer that is selectively cured to prevent or reduce resin squeeze-out, and the second sub-laminate, in accordance with embodiments of the present disclosure.

FIG. 2C illustrates a cross-sectional view of the assembled structure 210 along cross-sectional axis 212 as shown in FIG. 2B. FIG. 2C illustrates the first sub-laminate 200 attached to the second sub-laminate 208 by prepreg layer 204. Further, FIG. 2C illustrates the first resin dam 206-1 preventing (or reducing) prepreg squeeze-out along the perimeter of the internal hole 202. FIG. 2C further illustrates the second resin dam 206-2 preventing (or reducing) prepreg squeeze-out at a ledge 214 of the assembled structure 210.

As previously discussed with respect to FIGS. 1A-1D, FIGS. 2A-2C are also purely for illustrative purposes and should not be construed as limiting. The dimensions illustrated in FIGS. 2A-2C are purely illustrative and are not to be taken in a limiting sense. For example, the absolute (e.g., literal) dimensions of the drawings are non-limiting. Further, the relative dimensions between components are non-limiting. Further, the shapes shown in FIGS. 2A-2C are non-limiting. Finally, although FIGS. 2A-2C discuss sub-laminates 200, 208 and prepreg layer 204, the present disclosure is also applicable to any assemblage of a first component to a second component utilizing an adhesive layer, where selectively curing the adhesive layer at locations adjacent to a ledge of the final assemblage prevents resin bleed of the adhesive layer onto the ledge of the final assemblage during final curing of the adhesive layer.

Figure 3:
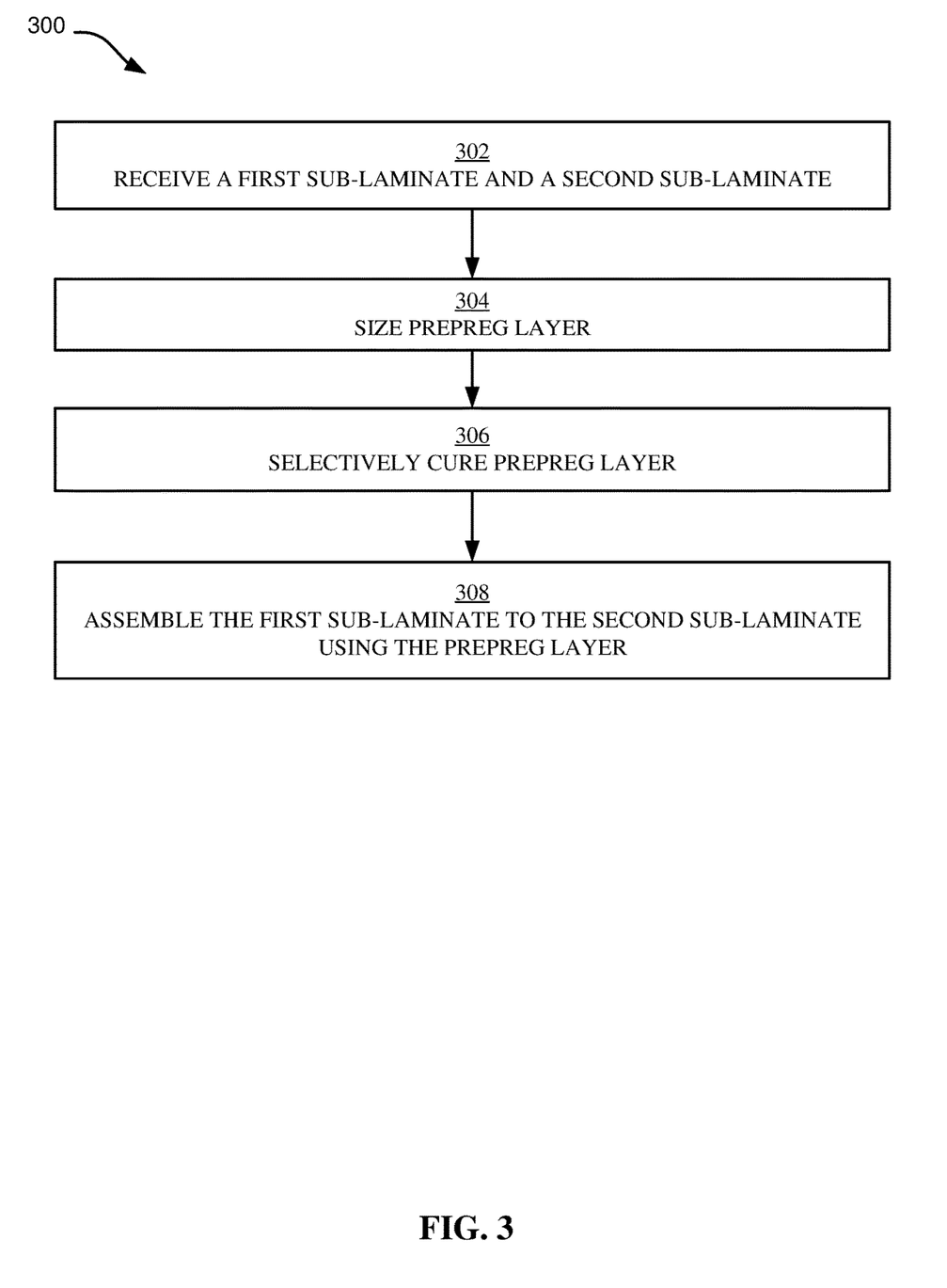
FIG. 3 illustrates a flowchart of an example method for fabricating an assembly with a selectively cured prepreg layer that prevents or reduces resin squeeze-out, in accordance with some embodiments of the present disclosure.

Referring now to FIG. 3, illustrated is a flowchart of an example method 300 for reducing prepreg resin squeeze-out in assembled structures, in accordance with some embodiments of the present disclosure.

Operation 302 includes receiving a first sub-laminate and a second sub-laminate. Operation 302 includes receiving at least two sub-laminates, but in various embodiments more than two sub-laminates can be received depending on the geometry of the assembled structure. In some embodiments, operation 302 includes manufacturing the first sub-laminate and the second sub-laminate.

In operation 302, the plurality of sub-laminates are configured to be combined to form an assembled structure. The combining can result in a portion of the first sub-laminate overlapping a portion of the second sub-laminate. This partial overlap results in a contact area (e.g., the overlapping area) and a non-contact area (e.g., the non-overlapping area). The transition between the contact area and the non-contact area can indicate a ledge where resin squeeze-out may be problematic to the fit and/or function of the assembled structure. In some embodiments, the assembled structure comprises a PCB.

Operation 304 includes sizing a prepreg layer. Sizing the prepreg layer can include routing (e.g., machining) the prepreg layer to a certain geometry to cover the contact area between the first sub-laminate and the second sub-laminate received in operation 302.

In some embodiments, sizing the prepreg layer includes undersizing (e.g., making smaller than necessary) areas adjacent to a ledge or cutout to allow some resin squeeze-out to occur before any squeezed-out resin enters the ledge or cutout. Thus, although forming one or more resin dams by selectively curing portions of the prepreg layer prior to assembly reduces prepreg squeeze-out, undersizing the prepreg layer can function as a redundant technique to ensure any residual prepreg squeeze-out does not contaminate the ledge.

Operation 306 includes selectively curing the prepreg layer at portions adjacent to the ledge of the assembled laminate. Selectively curing the prepreg layer can include selectively applying heat or UV radiation to the prepreg layer at predefined locations using, for example, a laser.

Alternatively, selectively curing the prepreg layer can include first masking the remainder of the prepreg layer (e.g., the portion of the prepreg layer that is not adjacent to a ledge) and subsequently applying directed heat or UV radiation to the masked prepreg layer so that only the portions of the prepreg layer adjacent to the ledges are cured. Such embodiments can allow for a laser, for example, to selectively cure the prepreg layer with decreased precision since the masking can limit inadvertent curing by misapplication of the laser. Embodiments utilizing masking can include steps of: (1) applying a mask to a remainder of the prepreg layer (e.g., where the remainder of the prepreg layer can correspond to areas of the prepreg layer that are not used as resin dams and are not adjacent to a ledge), (2) curing the prepreg layer in response to applying the mask, and (3) removing the mask in response to curing the prepreg layer.

In some embodiments, the prepreg layer is selectively cured by itself whereas in other embodiments the prepreg layer is selectively cured while attached to one of the first sub-laminate and the second sub-laminate. Selectively curing the prepreg layer while attached to one of the sub-laminates may be useful for simplifying assembly of the assembled structure insofar as the first sub-laminate, the second sub-laminate, and the prepreg layer would not all need to be simultaneously aligned. Instead, the first sub-laminate with the selectively cured prepreg layer is aligned with the second sub-laminate.

Operation 308 includes assembling the first sub-laminate to the second sub-laminate using the selectively cured prepreg layer. In some embodiments, operation 308 includes arranging the first sub-laminate, the second sub-laminate, and the prepreg layer, and applying heat, pressure, and/or UV radiation over a period of time to the arrangement in order to cure the prepreg layer, thereby adhering the first sub-laminate to the second sub-laminate. As previously discussed, while curing the prepreg layer, the selectively cured portions of the prepreg layer can function as resin dams to prevent or reduce prepreg squeeze-out from contaminating ledges of the assembled structure.

As previously discussed, the present disclosure is applicable to applications including a first component (a more general version of the first sub-laminate) bonded to a second component (a more general version of the second sub-laminate) using an adhesive layer (a more general version of the prepreg layer). This alternative method 300 can include receiving the first component and the second component (alternative operation 302), where the first component and the second component can comprise natural materials (e.g., wood, stone, etc.), metals, ceramics, polymers, composites, or other materials.

The alternative method 300 can further include applying an adhesive layer one of the first component or the second component at an overlap area between the first component and the second component in the assembled structure (alternative operation 304). The adhesive layer can include, but is not limited to, drying adhesives (e.g., solvent based adhesives or emulsion adhesives), pressure sensitive adhesives (e.g., acrylate polymers having controlled molecular weights), contact adhesives (e.g., polymeric or elastomeric compounds undergoing pressure-induced strain crystallization such as polychloroprene), multi-part adhesives (e.g., reactive combinations of polyesters, polyurethanes, polyols, acrylics, epoxies, and other resins), one part adhesives (e.g., compounds or combinations thereof which react in the presence of ultraviolet (UV) radiation, heat, moisture, or other environmental factors), and/or other adhesives.

The alternative method 300 can further include selectively curing a portion of the adhesive layer adjacent to a ledge of the assembled structure, where the curing can be performed by drying, pressurizing, heating, irradiating (e.g., UV radiation), reacting, or another curing mechanism (alternative operation 306).

The alternative method 300 can further include assembling the first component to the second component and curing the remainder of the adhesive layer. While curing the remainder of the adhesive layer, the selectively cured portions of the adhesive layer adjacent to the ledge of the assembled structure can function as resin dams and prevent or reduce adhesive squeeze-out from contaminating the ledge of the assembled structure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A method comprising:
   receiving a first sub-laminate and a second sub-laminate, wherein the first sub-laminate is configured to be joined to the second sub-laminate at an overlap area using a prepreg layer to form a structure having a ledge;
   selectively curing a portion of the prepreg layer adjacent to the ledge, wherein the portion of the prepreg layer that is adjacent to the ledge comprises a larger amount of dye-containing microcapsules relative to a remainder of the prepreg layer that is not adjacent to the ledge; and
   forming the structure by combining the first sub-laminate, the second sub-laminate, and the prepreg layer and curing the remainder of the prepreg layer.

2. The method of claim 1, wherein selectively curing the portion of the prepreg layer further includes:
   selectively heating the portion of the prepreg layer using a laser.

3. The method of claim 1, wherein selectively curing the portion of the prepreg layer further includes:
   applying a mask to the remainder of the prepreg layer;
   curing the prepreg layer in response to applying the mask; and
   removing the mask in response to curing the prepreg layer.

4. The method of claim 3, wherein the mask is configured to inhibit curing of the remainder of the prepreg layer.

5. The method of claim 1, wherein the portion of the prepreg layer adjacent to the ledge is less than one inch.

6. The method of claim 1, further comprising sizing the prepreg layer to approximate the overlap area by:
   routing the prepreg layer according to the overlap area.

7. The method of claim 1, further comprising sizing the prepreg layer to approximate the overlap area by:
   undersizing the prepreg layer at the portion of the prepreg layer adjacent to the ledge.

8. The method of claim 1, wherein the method further comprises:
   applying the prepreg layer to the first sub-laminate, and wherein selectively curing the portion of the prepreg layer adjacent to the ledge is configured to cause the prepreg layer to bond to the first sub-laminate at the portion of the prepreg layer adjacent to the ledge.

9. A printed circuit board (PCB) comprising:
   a first sub-laminate attached to a second sub-laminate at a contact area by a prepreg layer, wherein the PCB includes a ledge at a transition from the contact area to a non-contact area; and
   wherein the prepreg layer comprises a portion of the prepreg layer that is adjacent to the ledge and a remainder of the prepreg layer that is not adjacent to the ledge, and wherein the portion of the prepreg layer that is adjacent to the ledge has a higher degree of cure and a larger amount of dye-containing microcapsules relative to the remainder of the prepreg layer that is not adjacent to the ledge.

10. The PCB of claim 9, wherein the ledge includes an electrical contact.

11. The PCB of claim 9, wherein the first sub-laminate and the second sub-laminate are configured to perform electrical signal processing.

12. The PCB of claim 9, wherein the portion of the prepreg layer that is adjacent to the ledge is configured to function as a resin dam to reduce prepreg squeeze-out during assemblage of the first sub-laminate to the second sub-laminate using the prepreg layer.

13. The PCB of claim 9, wherein an area of the prepreg layer is equal to the contact area.

14. The PCB of claim 9, wherein an area of the prepreg layer is less than the contact area.

15. The PCB of claim 9, wherein the portion of the prepreg layer that is adjacent to the ledge has a higher glass transition temperature relative to the remainder of the prepreg layer that is not adjacent to the ledge.

16. The PCB of claim 9, wherein the portion of the prepreg layer that is adjacent to the ledge has a higher modulus relative to the remainder of the prepreg layer that is not adjacent to the ledge.

17. The PCB of claim 9, wherein the portion of the prepreg layer that is adjacent to the ledge has a higher strength relative to the remainder of the prepreg layer that is not adjacent to the ledge.

18. The PCB of claim 9, wherein the portion of the prepreg layer that is adjacent to the ledge has a lower toughness relative to the remainder of the prepreg layer that is not adjacent to the ledge.

19. A method comprising:
   receiving a first component and a second component, wherein the first component is configured to be joined to the second component at an overlap area using an adhesive layer to form a structure having a ledge;
   applying the adhesive layer to the overlap area on the first component;
   selectively curing a portion of the adhesive layer adjacent to the ledge, wherein the portion of the adhesive layer that is adjacent to the ledge comprises a larger amount of dye-containing microcapsules relative to a remainder of the adhesive layer that is not adjacent to the ledge; and forming the structure by combining the first component, the second component, and the adhesive layer and curing the remainder of the adhesive layer.

\* \* \* \* \*